(12) United States Patent
Hong

(10) Patent No.: US 8,863,779 B2
(45) Date of Patent: Oct. 21, 2014

(54) INTEGRATED SUPPLYING APPARATUS FOR GAS AND SIZING

(75) Inventor: David Hong, Causeway Bay (HK)

(73) Assignee: Active Tools International (HK) Ltd., Causeway Bay (HK)

(*) Notice: Subject to any disclaimer, the term of this patent is extended or adjusted under 35 U.S.C. 154(b) by 166 days.

(21) Appl. No.: 13/595,641

(22) Filed: Aug. 27, 2012

(65) Prior Publication Data
US 2013/0269811 A1    Oct. 17, 2013

(30) Foreign Application Priority Data
Apr. 16, 2012   (TW) .............................. 101206998 A

(51) Int. Cl.
*F16K 11/074*     (2006.01)
*B29C 73/02*      (2006.01)
*B60C 1/00*       (2006.01)

(52) U.S. Cl.
CPC .................................. *B60C 1/0041* (2013.01)
USPC .......................... 137/625.46; 141/38; 152/415

(58) Field of Classification Search
USPC ............. 137/625.29, 625.43, 625.46; 141/38; 152/415; 156/97, 115
See application file for complete search history.

(56) References Cited

U.S. PATENT DOCUMENTS

| | | | | |
|---|---|---|---|---|
| 2,736,339 A | * | 2/1956 | Asbury et al. ............ | 137/625.46 |
| 4,776,766 A | * | 10/1988 | Brent ............................ | 417/44.6 |
| 6,736,170 B2 | * | 5/2004 | Eriksen et al. .................. | 141/38 |
| 7,789,110 B2 | * | 9/2010 | Marini ............................ | 141/38 |
| 7,798,183 B2 | * | 9/2010 | Cegelski et al. ................. | 141/38 |
| 8,522,833 B2 | * | 9/2013 | Chou ............................. | 141/38 |
| 8,733,407 B2 | * | 5/2014 | Eckhardt ........................ | 141/38 |

* cited by examiner

*Primary Examiner* — John Fox
(74) *Attorney, Agent, or Firm* — Raymond R. Ferrera; Adams and Reese LLP

(57) ABSTRACT

The present invention discloses an integrated supplying apparatus for gas and sizing. It comprises a sizing barrel, a gas supply unit and a switching unit. The sizing barrel and the gas supply unit are both connected with the switching unit. When the switching unit is fixed in a first state by a safety component, the gas supply unit can only output high pressure gas through the switching unit. When the switching unit is converted into a second state by releasing the safety component, the gas supply unit in turn outputs some high pressure air into the sizing barrel through the switching unit, so that the sizing inside the sizing barrel is output under the action of the gas pressure and the gas inside the sizing barrel is then output when completing the output of the sizing.

7 Claims, 9 Drawing Sheets

INTEGRATED SUPPLYING APPARATUS FOR GAS AND SIZING

CROSS-REFERENCE TO RELATED APPLICATIONS

Pursuant to 35 U.S.C. 119(a), the instant application claims priority to prior Taiwan application number 101206998, filed Apr. 16, 2012.

FIELD OF THE INVENTION

The present invention relates to an integrated supplying apparatus for gas and sizing, and specifically relates to a design that integrates the output pipelines respective for supplying sizing and gas so as to prevent users from any misapplication.

BACKGROUND OF THE INVENTION

The vehicle can not run after its tire ruptures and the tire pressure is lost. Such that, only the tire is replaced or repaired, and then inflated, the vehicle can go on. Accordingly, the vehicle is generally equipped with a spare tire as required. However, the weight of the tire together with the rim will increase that of the vehicle body, and consequently increase the fuel consumption. This is neither economical nor environmental friendly. In order to reduce the vehicle load produced by one spare tire, a relative legerity tire repairing machine is currently developed by manufacturers to provide for the drivers in the vehicle. When the tire is flat due to rupture, such tire repairing machine can be used to repair and inflate the tire in emergency.

The known tire repair machine may also be used as a tire inflator, the structure thereof is composed of a sizing barrel and an air compressor provided in a housing, wherein, the sizing barrel and the air compressor are respectively connected with a sizing injection tube and an inflation tube, one end of the sizing injection tube and one end of the inflation tube are respectively provided with a sizing injection nozzle and an air intake nozzle. When used as a tire inflator, the air intake nozzle is combined to the air nozzle of the tire directly by the user. Powered on the air compressor and the high pressure air will be filled into the tire. When used as a tire repair machine, the sizing injection nozzle is firstly combined to the air nozzle of the tire. The pump is powered on to inject a proper quantity of sizing from the sizing barrel into the tire. Then the sizing injection nozzle is removed and alternatively the air intake nozzle is combined to the air nozzle of the tire. After that, the high-pressure air is inflated to the tire to reach an appropriate tire pressure. After the air intake nozzle is removed, let the vehicle run a distance slowly, during running, the sizing can flow uniformly on the inner wall surface of the tire to fill up the position of the rupture. The solidified sizing can avoid gas leakage. Therefore, the driver can drive the vehicle to the nearest maintenance for further inspection.

Although the housing is marked with the operation method of the aforementioned tire repairing machine, it is always difficult for those people who are not familiar with machine operation to distinguish whether the inflation tube or the sizing injection tube should be used at first. Moreover, misusage is also possible even for the people familiar with the operation. Therefore, the function of sizing injection is used by mistake when only the tire inflation is required. This may result in that some sizing is injected into the tire and air nozzle, and all of the air nozzle, sizing injection tube and the sizing injection nozzle must be replaced.

SUMMARY OF THE INVENTION

The purpose of the present invention is to solve the existing problems that, for a supplying apparatus for gas and sizing which is applied to the tire repairing machine, since the gas and sizing are respectively connected with the inflation tube and the sizing injection tube and further supplied separately, it is difficult for users to determine which of the inflation tube and the sizing injection tube should be used firstly; or the function of sizing injection may be used by mistake when only an air inflation is required.

In the present invention, an integrated supplying apparatus for gas and sizing is provided, which comprises a sizing barrel, a gas supply unit and a switching unit; the sizing barrel and the gas supply unit are both connected with the switching unit; wherein when the switching unit is fixed in a first state by a safety component, the gas supply unit can only output high pressure gas through the switching unit; when the switching unit is converted into a second state by releasing the safety component, the gas supply unit in turn outputs some high pressure gas into the sizing barrel through the switching unit, so that the sizing inside the sizing barrel is output under the action of the gas pressure, and the gas inside the sizing barrel is then output when completing the output of the sizing.

In the switching unit of the present invention, its conversion between the output of gas and sizing is achieved by means of rotation operation.

The technical solution of the present invention includes a sizing barrel, a gas supply unit and a switching unit; wherein the sizing barrel is provided with at least one gas inlet and at least one outlet for gas and sizing, and it is also loaded with sizing; the gas supply unit comprises an air compressor; and the switching unit comprises a valve seat and a rotary component. The valve seat is provided with four through holes (i.e. a first through hole, a second through hole, a third through hole and a fourth through hole) and two channels (i.e. a first channel and a second channel); wherein the two channels are not connected to each other. In the valve seat, the first through hole is connected to the first channel and further connected with a gas outlet of the air compressor, the second through hole is connected to the second channel and further connected with a filling nozzle, the third through hole is connected with the gas inlet of the sizing barrel and the fourth through hole is connected with the outlet for gas and sizing of the sizing barrel. The rotary component has two channels (i.e. a third channel and a fourth channel) that are not connected to each other. The rotary component is flexibly combined with the valve seat so that it can rotate with respect to the valve seat and its third channel is maintained to be connected to the first channel constantly. When the rotary component is located in a first position relative to the valve seat, the third channel is connected to the second channel so as to make the gas from the first through hole be output via the second through hole directly; when the rotary component is located in a second position relative to the valve seat, the third channel is connected to the third through hole instead of the second channel, and the fourth channel is connected to the fourth through hole, in which case the gas from the first through hole is finally input into the sizing barrel by passing through the third through hole, so that the sizing therein is output via the fourth and second through holes under the action of gas pressure.

In the present invention, in order to facilitate users' operations and prevent erroneous operations, the sizing barrel, the gas supply unit and the switching unit are all disposed inside the housing. The housing is provided with a cover plate which is provided with the safety component. When the rotary component is in a state of the first position, the safety component can restrain the rotary component from being operated and rotated; Only the safety component is dismounted, the rotary component can be operated and rotated.

In the present invention, the rotary component is a knob with a handle.

In order to enable the users to know the pressure of the output gas clearly, a gas distributing head is connected with the gas outlet of the air compressor in the present invention. The gas distributing head is provided with a first outlet and a second outlet; wherein the former is connected with the first through hole of the valve seat, and the latter is connected with a pressure gauge installed on the housing.

The integrated supplying apparatus for gas and sizing provided in the present invention is applied to tire repairing machines, in which the sizing is used as the material for filling in the hole of a broken tire.

BRIEF DESCRIPTION OF THE DRAWINGS

The present invention will be further described with reference to accompanying drawings and embodiments in the following. In the figures.

REFERENCE SIGNS

A . . . Tire Repairing Machine
B . . . Switching Unit
1 . . . Gas Supply Unit
11 . . . Motor
12 . . . Air Compressor
13 . . . Gas Distributing Head
130 . . . Inlet
131 . . . First Outlet
132 . . . Second Outlet
2 . . . Joint Seat
21 . . . First Perforation
22 . . . Second Perforation
3 . . . Valve Seat
30 . . . First Center Hole
31 . . . First Through Hole
32 . . . Second Through Hole
33 . . . Third Through Hole
34 . . . Fourth Through Hole
35 . . . First Channel
36 . . . Second Channel
4 . . . Rotary Component
40 . . . Second Center Hole
41 . . . Handle
42 . . . Third Channel
43 . . . Fourth Channel
44 . . . Leakage Stop Ring
5 . . . Sizing Barrel
51 . . . Outlet for Gas and Sizing
52 . . . Gas Inlet
53 . . . Joint
54 . . . Air Intake Nozzle
6 . . . Cover Plate
61 . . . Perforation
7 . . . Safety Component
71 . . . Handle Hole
8 . . . Housing
81 . . . Pressure Gauge
82 . . . Display Panel

DETAILED DESCRIPTION OF THE PREFERRED EMBODIMENT

Below the implementation of the present invention is explained in more detail in coordination with schemas and component symbols so that those skills familiar with this technology can practice the present invention after reading the specification.

Figure 1:
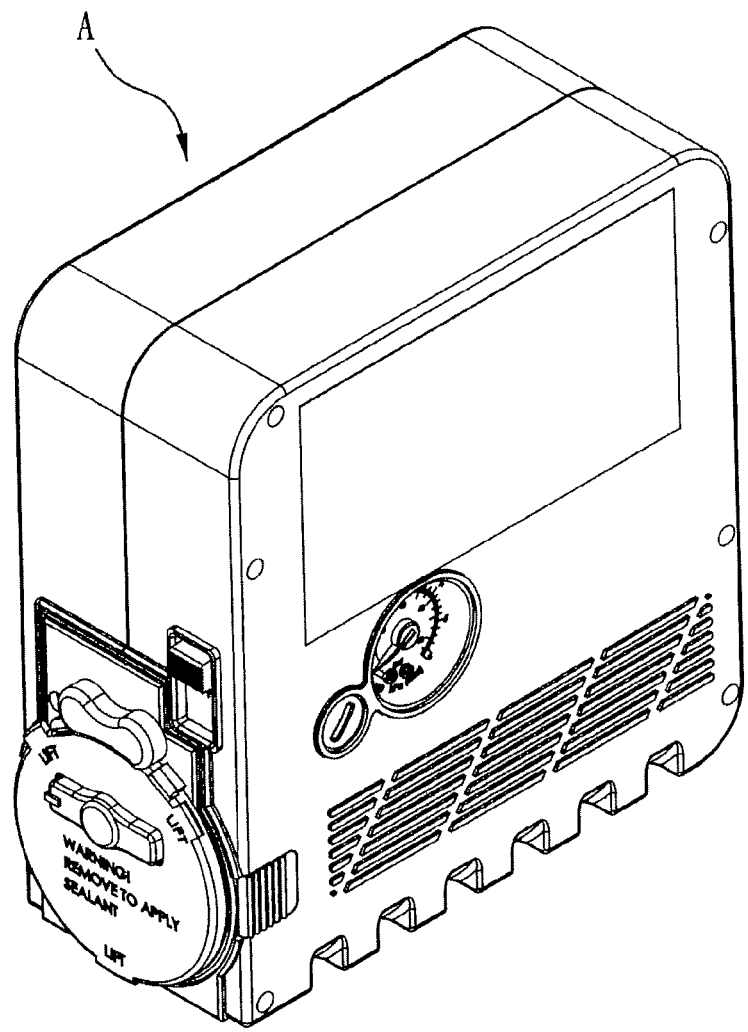
FIG. 1 is a stereograph illustrating the embodiments of the appearance structure of the present invention.

An integrated supplying apparatus for gas and sizing provided in the present invention can be applied to the tire repairing machine A as shown in FIG. 1.

Figure 2:
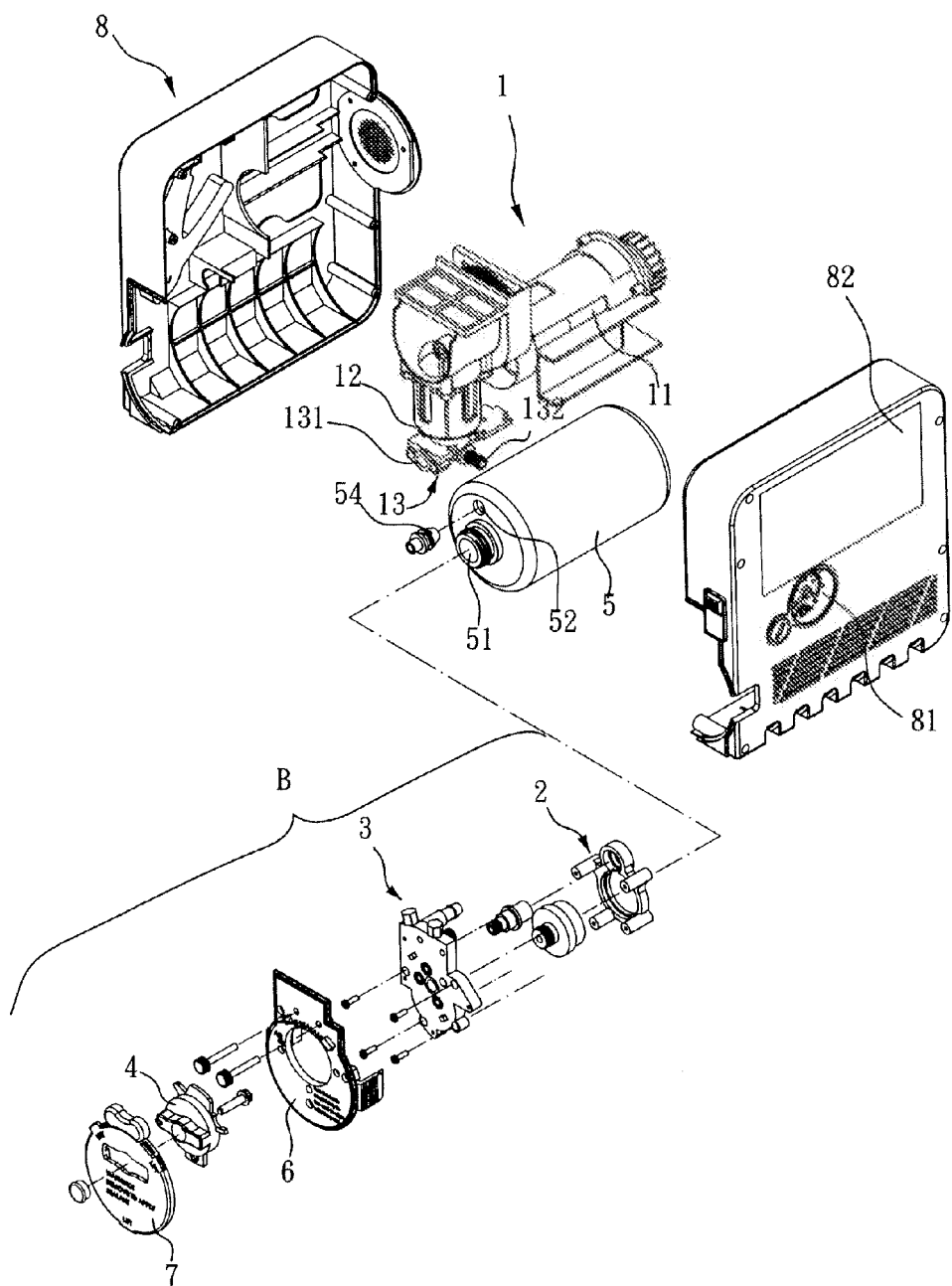
FIG. 2 is an exploded view illustrating the combination relation of the mainly components of the present invention.
Figure 3A:
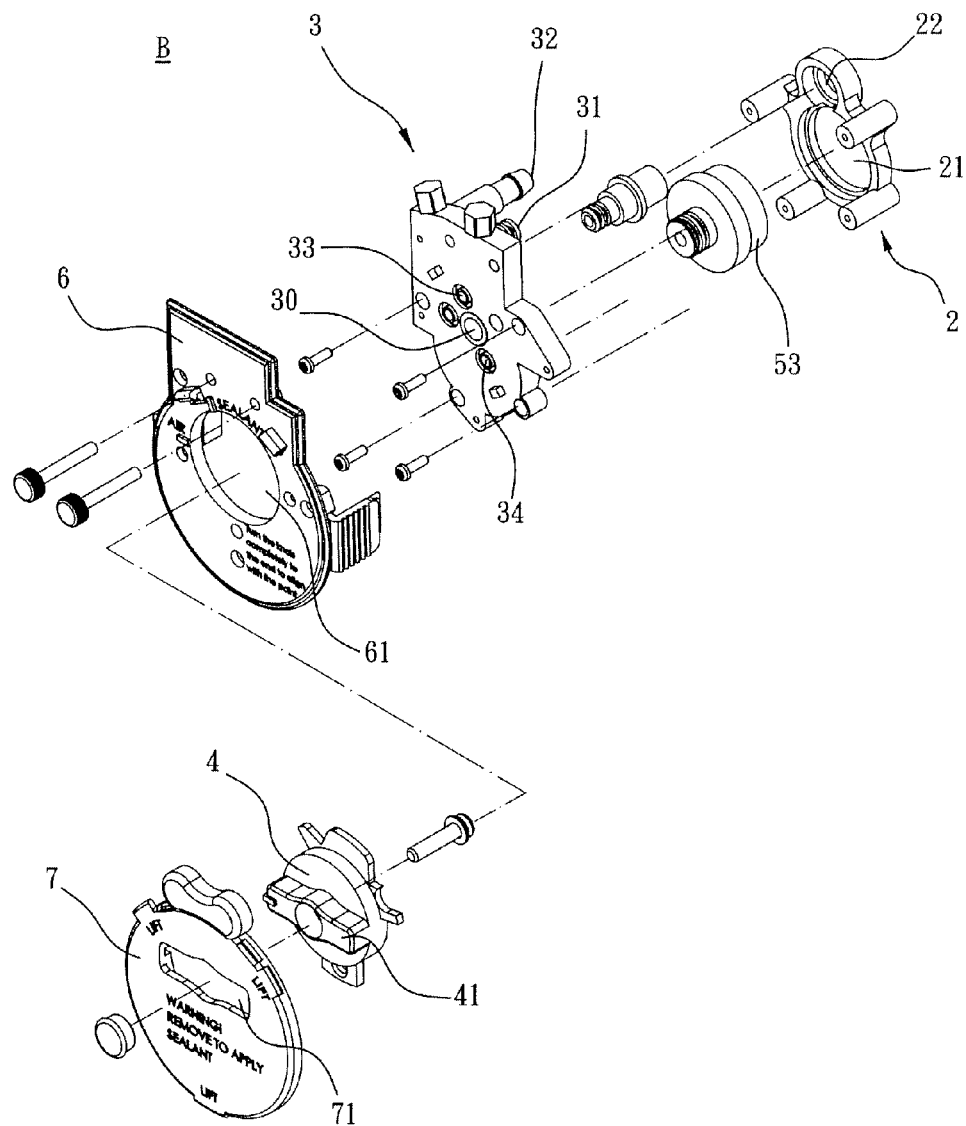
FIG. 3a is a partial enlarged view for a stereo exploded diagram illustrating the combination relationship between the components of the switching unit in the present invention.
Figure 3B:
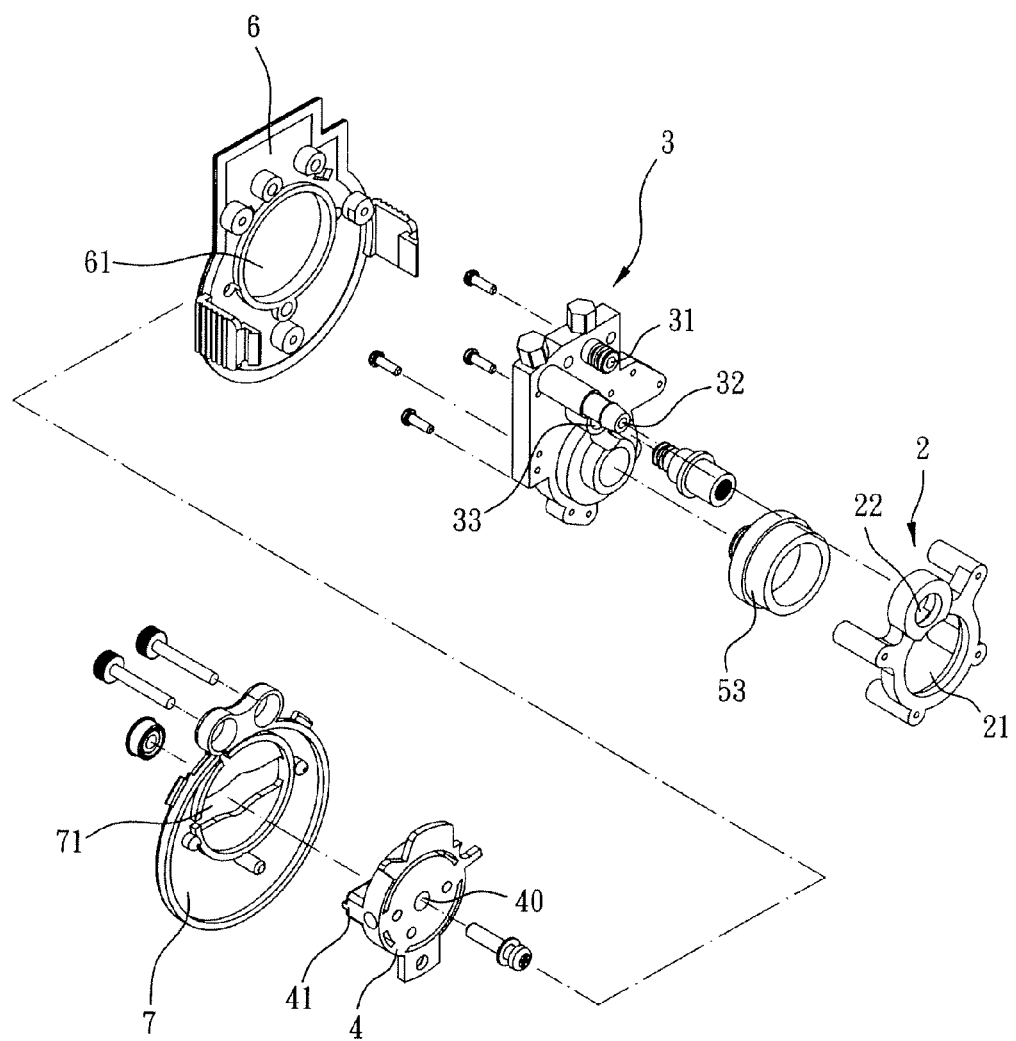
FIG. 3b is a partial enlarged view from another perspective for a stereo exploded diagram illustrating the combination relationship between the components of the switching unit in the present invention.
Figure 4A:
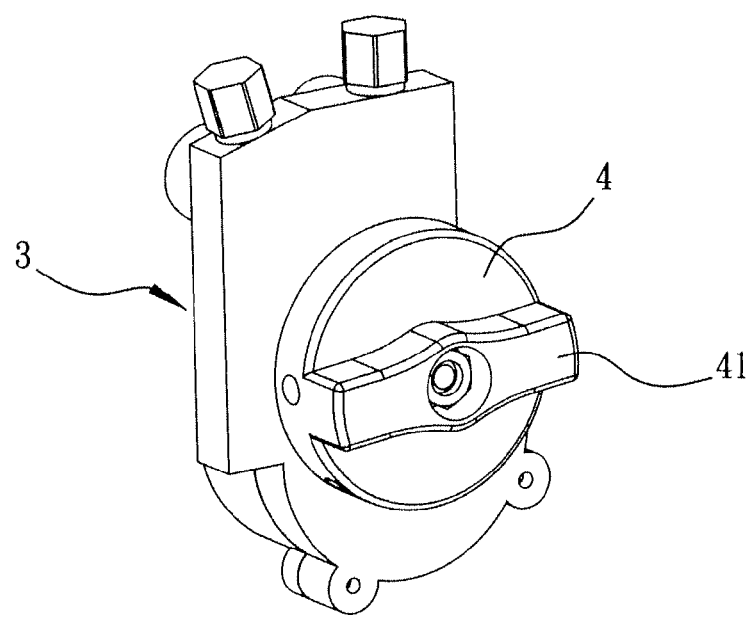
FIG. 4a is a stereograph illustrating an embodiment of the switching unit after combined in the present invention.
Figure 4B:
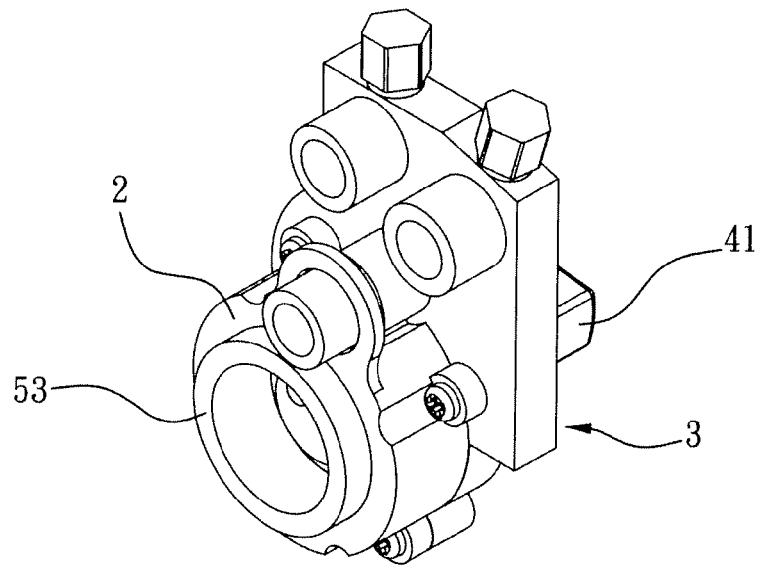
FIG. 4b is a stereograph illustrating the switching unit after combined in the present invention from another perspective.
Figure 4C:
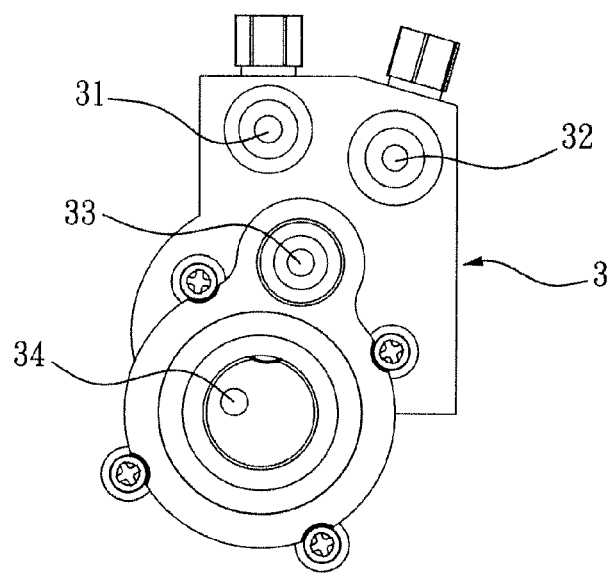
FIG. 4c is a front plan view illustrating an embodiment of the appearance structure of the switching unit after combined in the present invention.
Figure 4D:
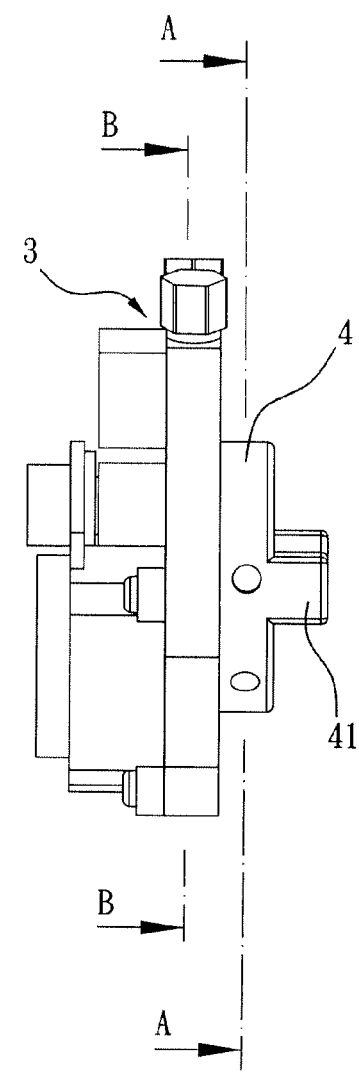
FIG. 4d is a side plan view illustrating an embodiment of the appearance structure of the switching unit after combined in the present invention.
Figure 5B:
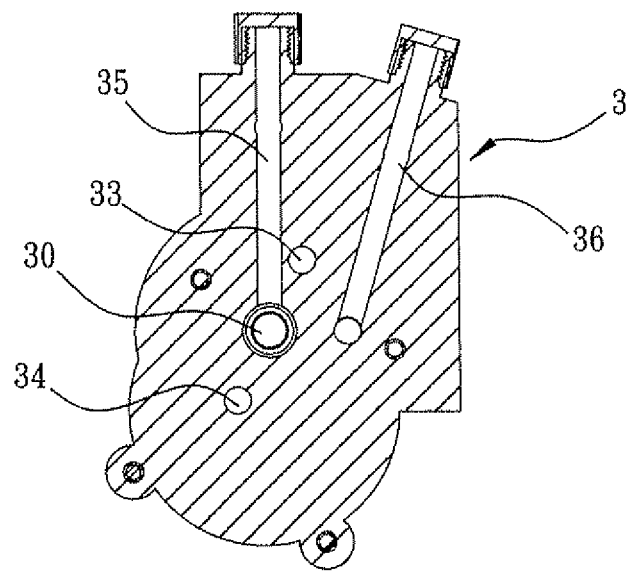
FIG. 5b is a sectional view for the internal structure of the rotary component taken on the section lines in FIG. 4d looking in the direction of the arrows B-B in FIG. 4d.
Figure 5A:
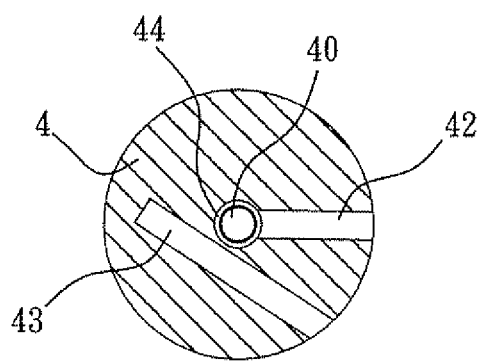
FIG. 5a is a sectional view for the internal structure of the valve seat taken on the section lines in FIG. 4d looking in the direction of the arrows A-A.

As shown in FIGS. 2, 3a and 3b, for the integrated supplying apparatus for gas and sizing provided in the present invention, its preferred embodiment includes a gas supply unit 1, a sizing barrel 5 and a switching unit B. The gas supply unit 1 further comprises an air compressor 12 that is connected with a motor 11 and a gas distributing head 13. The gas distributing head 13 is provided with an inlet 130, a first outlet 131 and a second outlet 132; wherein the inlet 130 is connected with a gas outlet (not shown in the figure) of the air compressor 12. Herein, when the motor 11 is driven by electric power, it can drive the air compressor 12 to produce high pressure air which can simultaneously flow out through the first outlet 131 and the second outlet 132. The sizing barrel 5 is one kind of container operable to hold the sizing for sealing and repairing a tire. It is provided with a gas inlet 51 and an outlet for gas and sizing 52; wherein the former is only operable to provide a channel for air flowing through, while the latter is operable to provide a channel for both air and sizing flowing through. The outlet for gas and sizing 52 is located at the mouth of the sizing barrel 5. The mouth is provided with an external thread so as to be screwed with a joint 53, wherein the joint 53 is used to connect a fourth through hole 34 of a valve seat 3. On the other hand, the gas inlet 51 can be combined with an air intake nozzle 54 which is further combined with a gas supply tube (not shown in the figure). The gas supply tube can then be connected with a third through hole 33 of a switching unit B which will be described in the following.

As shown in FIGS. 4a-4d, 5a and 5b, in a preferred embodiment of the present invention, the switching unit B includes a valve seat 3 and a rotary component 4. Herein, the valve seat 3 can be firstly molded by casting and further be processed to form four through holes (i.e. a first through hole 31, a second through hole 32, a third through hole 33 and a fourth through hole 34) and two channels (i.e. a first channel 35 and a second channel 36); wherein the two channels are located inside the valve seat 3 while not interconnected. In the valve seat, the first through hole 31 is connected to the first channel 35 and further connected with a gas outlet of the air compressor 12 through a pipeline; the second through hole 32 is connected to the second channel 36 and further connected with a gas piping provided with a filling nozzle; the third through hole 33 is connected with the gas inlet 52 of the sizing barrel 5 through a pipeline; and the fourth through hole 34 is connected with the outlet for gas and sizing 51 of the sizing barrel 5 through another pipeline. Moreover, the valve seat 3 is also provided with a first center hole 30 connected to the first channel 31.

Figure 6A:
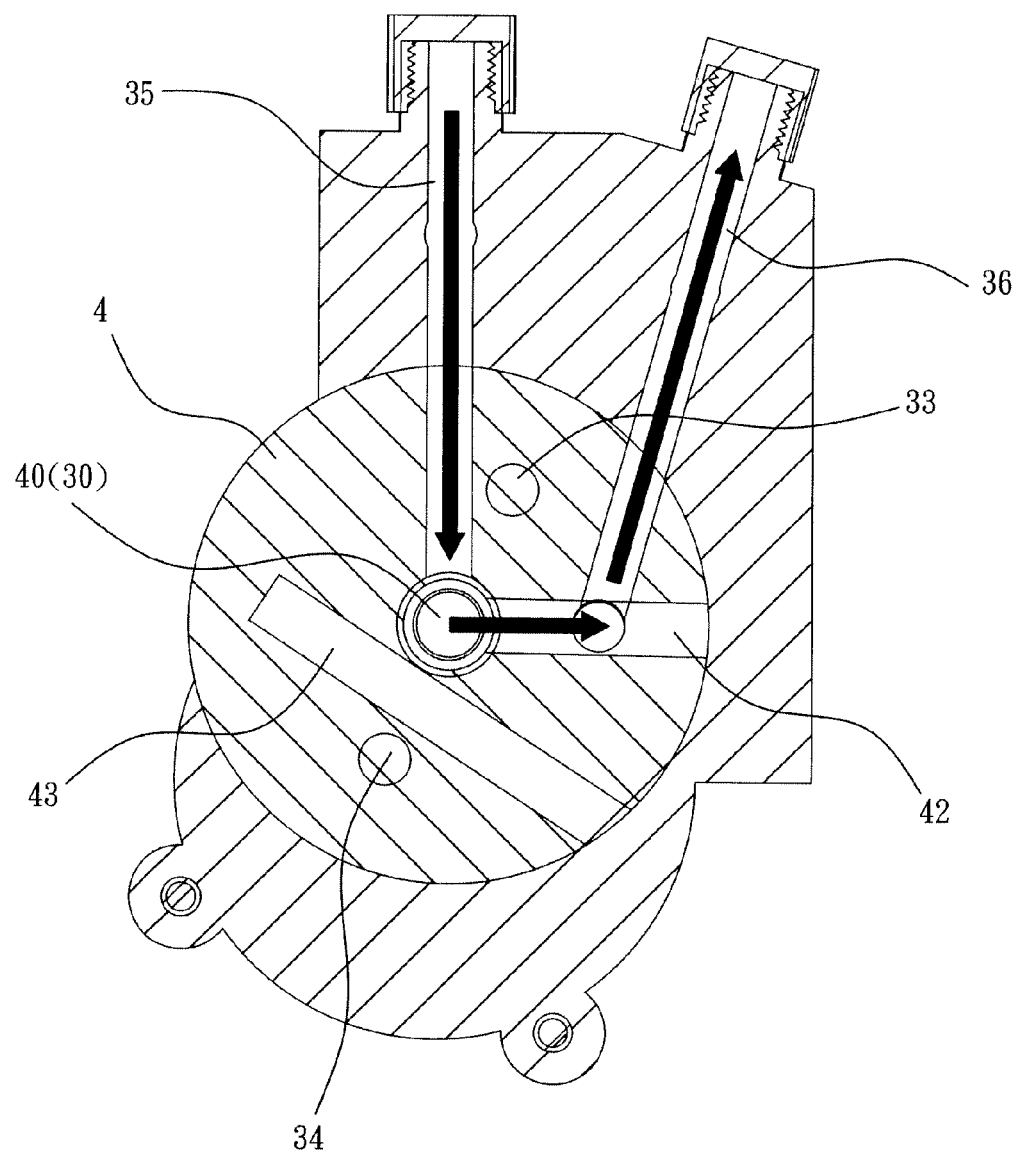
FIG. 6a is a schematic diagram for the flow path of gas when the rotary component is in the state of the first position.
Figure 6B:
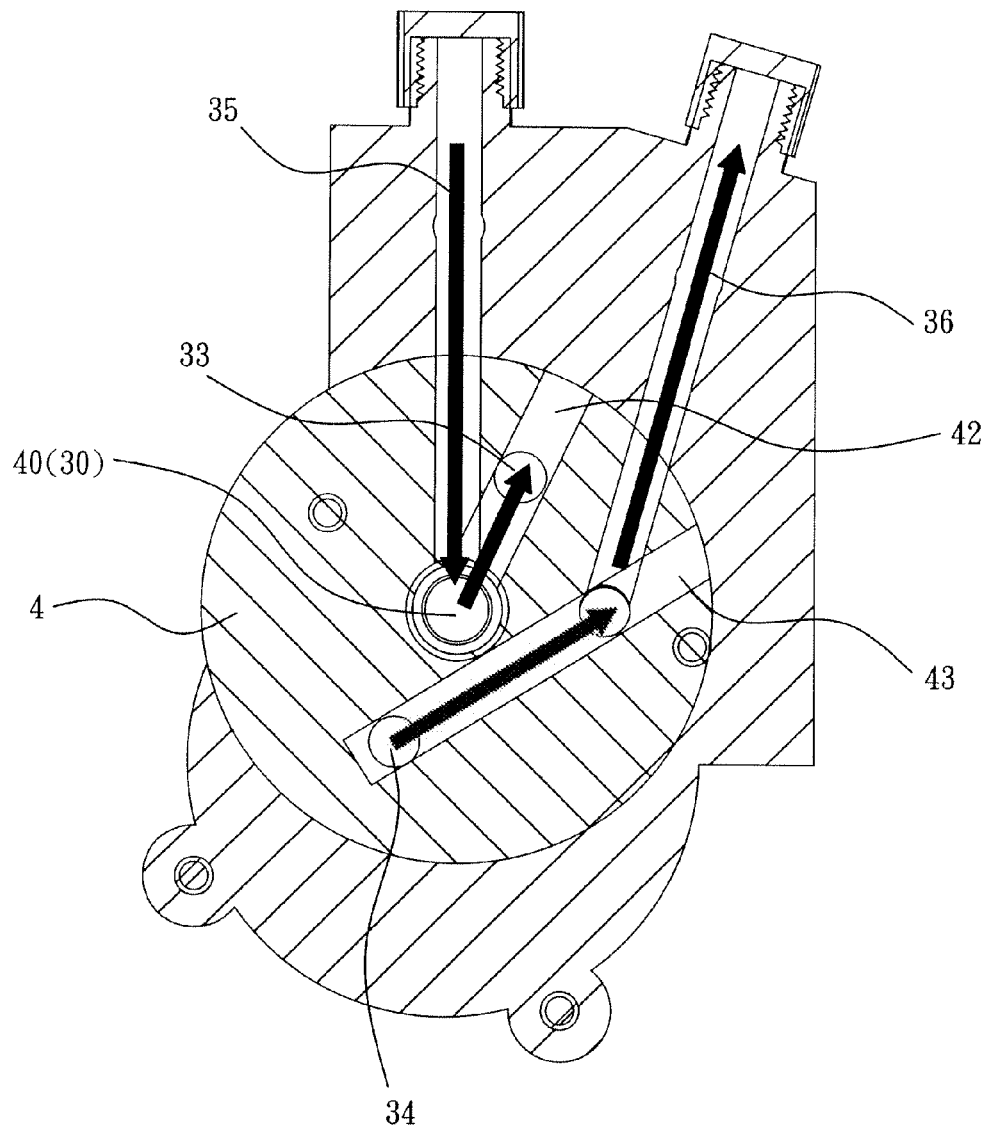
FIG. 6b is a schematic diagram for the flow path of gas and sizing when the rotary component is in the state of the second position.

In a preferred embodiment, the rotary component 4 is a knob with a handle 41. In this case, the rotary component 4 can be made of plastic material by utilization of injection molding or casting molding, and it is further processed to form a third channel 42 and a fourth channel 43 that are not connected to each other on its flat surface. Each of these two channels is closed at one end thereof which is located on the side of the rotary component after they have been drilled radially for a proper depth from the side of the rotary component 4. Herein, any suitable blocking component or material can be employed for closing. A second center hole 40 connecting to the third channel 42 is arranged at the center of the rotary component 4. The second center hole 40 is further sheathed with a leakage stop ring 44 on its periphery. In the present invention, a bolt is used to passes through the second center hole 40 of the rotary component 4 and the first center hole 30 of the valve seat 3 successively, and then it is locked and fixed so that the rotary component 4 can be flexibly combined with the valve seat 3; i.e. the rotary component 4 and the valve seat 3 can rotate relative to each other. Additionally, sealing is also formed between the first and second center holes 30 and 40 by virtue of the leakage stop ring 44, so that the third channel 42 is maintained to be connected to the first channel 35 of the valve seat 3 constantly. By virtue of the foregoing components, when the rotary component 4 is located in a first position relative to the valve seat 3 (as shown in FIG. 6a), the third channel 42 of the rotary component 4 is connected to the second channel 36 of the valve seat 3 so that the gas entering the first channel 35 from the first through hole 31 will enter the third channel 42 and the second channel 36 via the first center hole 30 and the second center hole 40, and such gas will then be output from the second through hole 32 (as indicated by the arrow direction in FIG. 6a). When the rotary component 4 is rotated to be located in a second position relative to the valve seat 3 (as shown in FIG. 6b), the third channel 42 is connected to the third through hole 33 instead of the second channel 32, and the fourth channel 43 is connected to the fourth through hole 34, in which case the gas entering the first channel 35 from the first through hole 31 will finally enter the sizing barrel 5 after it has entered the third channel 42 and the third through hole 33 via the first center hole 30 and the second through hole 40 (as indicated by the arrow direction in FIG. 6b), so that the sizing inside the sizing barrel 5 is output via the fourth through hole 34, the fourth channel 43 and the second through hole 32 under the action of gas pressure.

As shown in FIG. 2, all of the foregoing sizing barrel 5, the gas supply unit 1 and the switching unit B are arranged within a housing 8. In a preferred embodiment of the present invention, beside one side of the housing is provided with a cover plate 6 with a perforation 61. The rotary component 4 then passes through the perforation 61 when the cover plate has been arranged on the housing 8. The cover plate 6 can be further combined with a safety component 7, which has a handle hole 71 with the shape corresponding to that of the handle 41 of the rotary component 4. The safety component 7 in the present invention is used to fix the cover plate 6 when the rotary component 4 is in the first position as shown in FIG. 6a, so that the handle 41 passes through the handle hole 71 to prevent the rotary component 4 from being operated and rotated. In this case, the integrated supplying apparatus herein can only function as outputting high pressure air, and it cannot output the sizing so as to prevent the users from faulty operation. When the user needs to repair a tire by virtue of some output sizing, the safety component 7 has to be dismounted at first so that the handle 41 can get away from the restraint of the handle hole 71. In this way, the user can rotate the rotary component 4 to the second position to output the sizing.

The housing 8 can be further provided with a display panel 82 and a pressure gauge 81. Herein the pressure gauge 81 is connected with the second outlet 132 of the gas distributing head 13 by a pipeline. Accordingly, the air pressure fed to the joint seat 2 by the air compressor 12 can be displayed by the pressure gauge 81 synchronously, in which case the user can determine and adjust the inflation time accordingly. The display panel 82 can be a light guide plate with an inclined surface and a backlight (not shown in the figures) on its backside. It is arranged on the surface of the housing 8 so as to display the related information more clearly.

The operation method of the present invention is as follows.

The tire repairing machine A can be carried with a vehicle by the user. In this way, in the event that the user determines to inflate a tire by himself without obtaining tire inflation service from an automobile repair station, this tire repairing machine A can be taken out for usage. Without taking off the safety component 7 (as shown in FIG. 1 and FIG. 6a), the rotary component 4 is maintained in the state of the first position. At this moment, the user starts the power supply so that the motor 11 can drive the air compressor 12 to produce high pressure gas, wherein the high pressure gas simultaneously flows out through the first outlet 131 and the second outlet 132 and the gas pressure can be further displayed on the pressure gauge 81. The high pressure gas flowing out of the first outlet 131 firstly enters the first channel 34 through the first through hole 31 of the valve seat 3. Subsequently, it enters the third channel 42 and the second channel 36 via the second center hole 40 of the rotary component 4 and the first center hole 30 before it is output through the second through hole 32. In this way, the tire can be inflated directly.

When it is intended to repair a tire with rupture and air leakage, the safety component 7 has to be taken off at first. In this case, the handle 41 of the rotary component 4 gets away from the restraint of the handle hole 71, and the rotary component 4 can be rotated to the second position. Herein accordingly, the high pressure gas flowing out through the first outlet 131 firstly enters the first channel 35 through the first through hole 31. After that, it enters the third channel 42 and the third through hole 33 via the first center hole 30 and the second center hole 40 before it enters the sizing barrel 5. In this case, the sizing inside the sizing barrel 5 is pushed out through the outlet for gas and sizing 51 under the action of the air pressure. The sizing then flows out by passing through the fourth through hole 34, the fourth channel 43, the second channel 36 and the second through hole 32. Finally, it is injected into the tire via a filling line connected with the second through hole 32 and a filling nozzle connected with the air nozzle of the tire. When all the sizing inside the sizing barrel is used up, the gas inside the sizing barrel 5 is continued to be injected into the tire so that a certain pressure can be maintained within the tire. In the following, the filling nozzle is dismounted immediately, and the vehicle is made to run slowly for a certain distance in such a way the sizing can flow uniformly along the surface of the inner wall of the tire to fill in the rupture location. The sizing can prevent the air inside the tire from leakage when it is solidified. In this case, the driver can drive the vehicle to a repair station nearby for further overhauling.

The preferred embodiments mentioned above are only intended to illustrate the present invention. Instead, they are not intended to limit the present invention in any form. Therefore, any modifications or alternations related to the present invention should be included in the scope of present invention, as long as they are made within the spirit of the present invention.

The invention claimed is:

1. An integrated supplying apparatus for gas and sizing, wherein comprising:
   a sizing barrel provided with at least one gas inlet and at least one outlet for gas and sizing; wherein the sizing barrel is loaded with sizing;
   a gas supply unit comprising an air compressor;
   a switching unit comprising a valve seat and a rotary component;
   the valve seat is provided with a first through hole, a second through hole, a third through hole and a fourth through hole; it is also provided with a first channel and a second channel that are not interconnected; wherein the first through hole is connected to the first channel and further connected with a gas outlet of the air compressor, the second through hole is connected to the second channel and further connected with a filling nozzle, the third through hole is connected with the gas inlet of the sizing barrel and the fourth through hole is connected with the outlet for gas and sizing of the sizing barrel;
   the rotary component has a third channel and a fourth channel that are not interconnected; the rotary component is flexibly combined with the valve seat so that it can rotate with respect to the valve seat and its third channel is maintained to be connected to the first channel constantly; when the rotary component is located in a first position relative to the valve seat, the third channel is connected to the second channel so as to make the gas from the first through hole be output via the second through hole directly; when the rotary component is located in a second position relative to the valve seat, the third channel is connected to the third through hole instead of the second channel, and the fourth channel is connected to the fourth through hole, in which case the gas from the first through hole is finally input into the sizing barrel by passing through the third through hole, so that the sizing inside the sizing barrel is output via the fourth and second through holes under the action of gas pressure.

2. The integrated supplying apparatus for gas and sizing of claim 1, wherein the rotary component is a knob with a handle.

3. The integrated supplying apparatus for gas and sizing of claim 1, wherein the switching unit also comprises a safety component; the rotary component is restraint in the first position when the safety component is combined with the rotary component together.

4. The integrated supplying apparatus for gas and sizing of claim 3, wherein the switching unit also comprises a cover plate and a safety component; the safety component has a handle hole with the shape corresponding to that of the handle of the knob; when the safety component is to fixed to the cover plate, the handle passes through the handle hole to restrain the knob.

5. The integrated supplying apparatus for gas and sizing of claim 4, wherein all of the sizing barrel, the gas supply unit and the switching unit are arranged inside the housing, while the cover plate is fixed on the housing.

6. The integrated supplying apparatus for gas and sizing of claim 5, wherein the gas outlet of the air compressor is connected with a gas distributing head; the gas distributing head is provided with a first outlet and a second outlet; wherein the first outlet is connected with the first through hole of the valve seat, and the second outlet is connected with a pressure gauge installed on the housing.

7. The integrated supplying apparatus for gas and sizing of claim 1, wherein the integrated supplying apparatus for gas and sizing is applied to tire repairing machines, in which the sizing is used as the material for filling in the hole of a broken tire.

* * * * *